(12) United States Patent
Fitzmaurice

(10) Patent No.: US 11,618,035 B2
(45) Date of Patent: Apr. 4, 2023

(54) ENDLESS MACERATION CONVEYOR ASSEMBLY WITH JUICE DEFLECTOR

(71) Applicant: Alan Lewis Fitzmaurice, Brisbane (AU)

(72) Inventor: Alan Lewis Fitzmaurice, Brisbane (AU)

( * ) Notice: Subject to any disclaimer, the term of this patent is extended or adjusted under 35 U.S.C. 154(b) by 203 days.

(21) Appl. No.: 16/764,436

(22) PCT Filed: Nov. 16, 2018

(86) PCT No.: PCT/AU2018/000223
§ 371 (c)(1),
(2) Date: May 15, 2020

(87) PCT Pub. No.: WO2019/095001
PCT Pub. Date: May 23, 2019

(65) Prior Publication Data
US 2020/0353476 A1    Nov. 12, 2020

(30) Foreign Application Priority Data
Nov. 17, 2017    (AU) .................................. 2017904653

(51) Int. Cl.
*B02C 18/22*    (2006.01)
*B02C 23/40*    (2006.01)
(Continued)

(52) U.S. Cl.
CPC .......... *B02C 18/2241* (2013.01); *B02C 23/40* (2013.01); *B65G 17/067* (2013.01);
(Continued)

(58) Field of Classification Search
CPC ... B02C 18/2241; B02C 23/40; B65G 17/067; B65G 21/08; B65G 21/2081;
(Continued)

(56) References Cited

U.S. PATENT DOCUMENTS 3,093,064 A * 6/1963 Burner .................... C13B 10/04
                                                    100/37
3,275,472 A * 9/1966 Tantawi ................ C13B 10/107
                                                    127/5
(Continued)

FOREIGN PATENT DOCUMENTS

| GB | 15582 A | 4/1907 |
| IN | 201814012483 A | 1/2019 |

(Continued)

*Primary Examiner* — Mark A Deuble
(74) *Attorney, Agent, or Firm* — Bonini IP Law, LLC; Frank J. Bonini, Jr.

(57) ABSTRACT

In a maceration conveyor assembly (10) a juice deflector (50) deflects juice around a return run of a conveyor into a trough (51). Preferably the juice deflector and trough are configured as opposed axially extending V-shaped stainless steel plates. The assembly (10) feeds into a first mill (11) of a milling tandem, and output from the mill (11) is delivered onto another conveyor and carried to the next mill in the tandem. Low pol maceration liquid is returned to the conveyor via return lines to respective distribution weirs (16) and (17). The conveyor assembly (10) includes an inlet end (20) and an outlet end (21) all supported on a supporting framework (22) so that the assembly is inclined from the inlet end (20) to the outlet end (22). An endless plate conveyor (25) comprises interconnected perforated plates (26) adapted to pivot relative to each other in chain like fashion.

17 Claims, 6 Drawing Sheets

(51) Int. Cl.
*B65G 17/06* (2006.01)
*B65G 21/08* (2006.01)
*B65G 21/20* (2006.01)
*B65G 23/06* (2006.01)
*C13B 10/02* (2011.01)

(52) U.S. Cl.
CPC .......... *B65G 21/08* (2013.01); *B65G 21/2081* (2013.01); *B65G 23/06* (2013.01); *C13B 10/02* (2013.01); *B65G 2201/0202* (2013.01); *B65G 2207/26* (2013.01); *B65G 2812/02495* (2013.01)

(58) Field of Classification Search
CPC ............ B65G 23/06; B65G 2201/0202; B65G 2207/26; B65G 2812/02495; C13B 10/02; C13B 5/04; C13B 10/107
See application file for complete search history.

(56) References Cited

U.S. PATENT DOCUMENTS

| | | | |
|---|---|---|---|
| 3,420,708 A | | 1/1969 | Schaffer |
| 3,552,304 A | | 1/1971 | French et al. |
| 3,553,013 A | * | 1/1971 | Diaz-Compain ..... C13B 10/107 127/3 |
| 3,661,082 A | | 5/1972 | French et al. |
| 4,643,088 A | * | 2/1987 | Kollmar ................... A23N 1/00 100/118 |
| 6,245,153 B1 | * | 6/2001 | Gonzales ................ C13B 20/02 127/55 |
| 7,964,105 B2 | * | 6/2011 | Moss ..................... B01D 33/41 100/37 |
| 8,851,277 B2 | * | 10/2014 | Olsen ..................... B65G 15/62 198/860.3 |
| 9,540,175 B1 | | 1/2017 | Van Dalsem et al. |
| 10,245,526 B2 | * | 4/2019 | White ....................... C08C 2/02 |

FOREIGN PATENT DOCUMENTS

| | | |
|---|---|---|
| PH | 1-2018-000088 A | 2/2019 |
| WO | WO2017013517 A1 | 1/2017 |

* cited by examiner

ENDLESS MACERATION CONVEYOR ASSEMBLY WITH JUICE DEFLECTOR

TECHNICAL FIELD

THIS INVENTION relates to a conveyor and in particular but not limited to a conveyor having drainage capability for use in maceration of sugarcane in a sugarcane processing plant. The conveyor could be used in other circumstances where drainage is desirable.

BACKGROUND

Sugarcane milling tandems employ mills where low pol liquid extracted downstream is recycled back to the preceding mills. This low pol liquid is applied to shredded cane upstream of the preceding mills. Water is usually applied just before the last mill. While most juice is collected at the first mill, residual juice is collected along the tandem in smaller and smaller amounts and due to the closed loop, with the addition of a small amount of water, the output to process is via a collector at or adjacent the first mill.

The present invention concerns maceration of partially processed sugarcane prior to entry to a mill. The cane is in a comminuted state having been shredded, chopped or it can also have been processed in a preceding mill, the object in this case being to macerate the partially processed cane and thereby improve efficiency of removal of the remaining juice.

Sugarcane processing is a very well developed art. The overall process basically involves production of solids by juice extraction, purification and evaporation. Overall efficiency is dependent on the dissolved solids collected in the first stage. This first stage has been the subject of much attention over many years. Sugarcane processing could be described as a "crowded art" in the sense that the basic processes of maceration to improve yield is very well known and achievable efficiencies have long been thought to have peaked. Even though these processes are well known and very efficient as in many industries small increments in improved efficiency can result in large cost savings over time. The present invention arises in this environment where what might otherwise be seen as a small advance, in hindsight, in fact arises where the prevailing thinking is that no advance is possible, that all avenues for development have been tried, and that all scope for invention has been exhausted.

Outline

With the above in mind the present invention resides in one broad aspect in an endless maceration conveyor, there being an underside arrangement below the conveyor employing a juice deflector to deflect juice about a return run of the conveyor. Typically there is a juice trough below the deflector which deflector and trough are configured as axially extending and opposed V-shaped stainless steel plates with the deflector overlaying and deflecting juice around the return run of the conveyor. The deflector typically has an apical region which is rounded to inhibit fibre accumulation in this region. Preferably, the conveyor comprises a chain like arrangement of pivotally connected flow through plates arranged to form a substantially contiguous surface across adjacent plates along an upper contact surface of the conveyor in order to inhibit clogging of the conveyor.

It is preferable that every plate in the conveyor have flow through but this need not be the case. Flow through is preferably accomplished by holes distributed across each plate. The holes may be slots, round holes or any other shape. The holes are typically distributed through a central region of the plate with marginal edge regions being absent holes. The holes can be randomly distributed or uniformly distributed. In one form the holes are generally set in a line with some of the holes along the line being offset. The holes can be in a repeated pattern. In another form the holes form a zigzag pattern. In another form the holes are in an overlapping polygonal pattern. Typically, the plates are all identical and bridge between respective drive chains having specially designed chain links, each chain link having a plate attachment and each plate having a corresponding chain link attachment at each end. Preferably, adjacent plates share pivotal sliding surfaces extending between opposed chain links. Preferably, each plate has edges formed to accommodate mutual sliding as in a channel, groove or recess on an underside of the plate. In one preferred embodiment the plates are asymmetric in profile having a leading edge and a trailing edge. Preferably, the leading edge is concealed under the trailing edge of the adjacent plate. Each edge is preferably part of a curve, each curve on each edge of each plate being of slightly different diameter. The edge is preferably a pressed edge.

In another aspect the invention provides, in a sugarcane processing plant, an endless conveyor as described above located in a conveyor trough having respective opposed side walls, the side walls overlapping marginal edges of conveyor along the trough.

Opposite ends of the trough comprise a trough inlet at one end and a trough outlet at the other end, the conveyor having a conveyor inlet end adjacent the trough inlet end and an outlet adjacent the trough outlet, respective chainwheel pairs at the opposite ends of the conveyor being adapted to engage the chain links, one chainwheel pair comprising a drive set and the other chainwheel pair comprising an idler set, a drive connected to the drive set, the inlet to the conveyor and the inlet to the trough being located below the outlet so that the conveyor and trough are inclined, the drive being located adjacent the outlet. The underside arrangement below the conveyor preferably includes a juice deflector, the deflector being arranged to deflect juice around a return run of the conveyor above the trough. The plate and trough are preferably configured as axially extending and opposed V-shaped stainless steel plates with the deflector overlaying and deflecting juice around the return run of the conveyor. The deflector typically has an apical region which is rounded to inhibit fibre accumulation in this region.

In another independent aspect there is provided in a sugarcane processing plant, a maceration conveyor having a flow through surface and a collection trough below the maceration conveyor, a collection trough washdown facility comprising a washdown inlet adapted to supply wash down liquid to the collection trough in order to wash down any fibrous material accumulating in the trough. Preferably, the conveyor and collection trough are inclined to the horizontal and the washdown facility includes an inlet adjacent an upper region of the trough. Preferably, the liquid supplied to the washdown facility is recycled liquid from downstream mills in a milling tandem.

In another aspect there is provided in combination, in a sugarcane processing plant, a maceration conveyor having a flow through surface above a collection trough below the maceration conveyor, a collection trough washdown facility comprising a washdown inlet adapted to supply wash down liquid to the collection trough in order to wash down any fibrous material accumulating in the trough, the flow through surface comprising plates articulated in a conveyor and having holes in the plates for passage of liquid through the plates. The washdown may employ a pumped liquid under pressure and including outlet nozzles at spaced locations along and/or across the collection trough.

In a still further aspect there is provided, in a sugarcane processing plant, an endless perforated maceration conveyor having a forward run and a return run, the forward run having an outer conveying surface, the outer conveying surface being substantially planar along the conveyor and comprising relatively narrow overlapping plates, the conveyor being divided along its length by the plates overlapping at their junctures, where along the forward run the junctures present downwardly curving overlapping edges of adjacent plates, respective chains attached to opposite ends of the plates, each plate having a corresponding chain link, a chain drive at the end of the forward run and an idler at the end of the return run, driving the chains in concert to thereby drive the conveyor. Preferably, each plate has a leading edge and a trailing edge such that in the forward run, the leading edge is located under the trailing edge of an adjacent plate. Typically, the juncture of adjacent plates provides a small raised section complementing the downwardly curved overlapping leading and trailing edges. The underside arrangement below the conveyor, can employ a juice deflector and juice trough which are configured as axially extending and opposed V-shaped stainless steel plates with the deflector overlaying and deflecting juice around the return run of the conveyor. The deflector typically has an apical region which is rounded to inhibit fibre accumulation in this region.

BRIEF DESCRIPTION OF THE DRAWINGS

In order that the present improvements may be more readily understood and put into practical effect reference will now be made to the accompanying drawings which illustrate preferred embodiments of the invention and wherein.

METHOD OF PERFORMANCE

Figure 1:
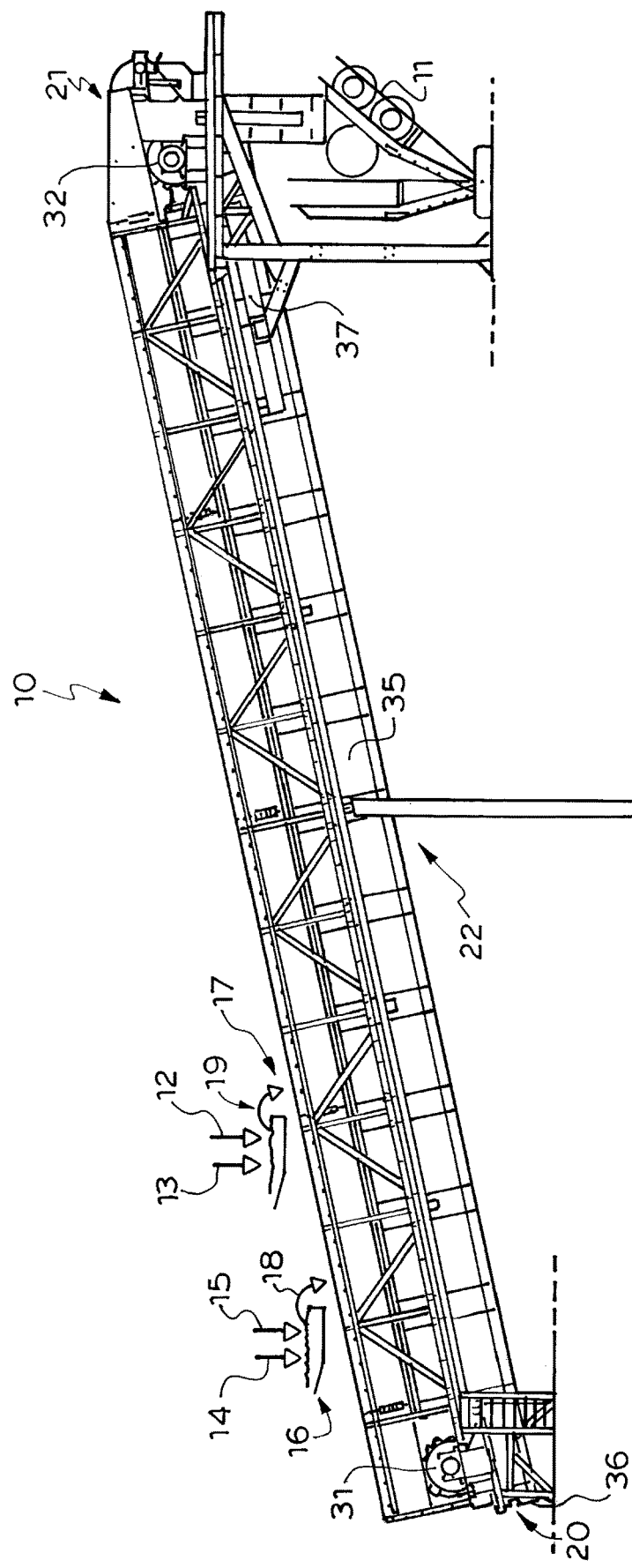
FIG. 1 is a schematic side view of a maceration conveyor according to the present invention.

Referring to the drawings and initially to FIG. 1 there is illustrated a maceration conveyor assembly 10 feeding into a first mill 11 of a milling tandem, the downstream mills in the tandem not being shown it being appreciated that output from the mill 11 is delivered onto another conveyor and carried to the next mill in the tandem. Low pol maceration liquid is returned to the conveyor via return lines 12, 13, 14 and 15 to respective distribution weirs 16 and 17. Weirs 16 and 17 include overflows 18 and 19 which extend across the conveyor.

The conveyor assembly 10 includes an inlet end 20 and an outlet end 21 all supported on a supporting framework 22 so that the assembly is inclined from the inlet end 20 to the outlet end 22.

Figure 2:
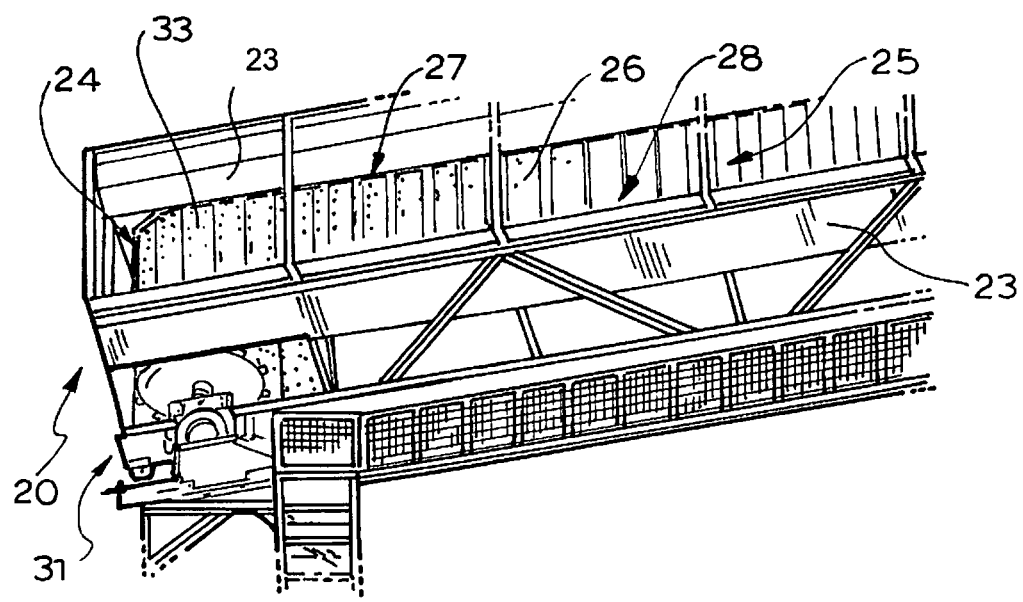
FIG. 2 is a view from above of an inlet end.
Figure 3:
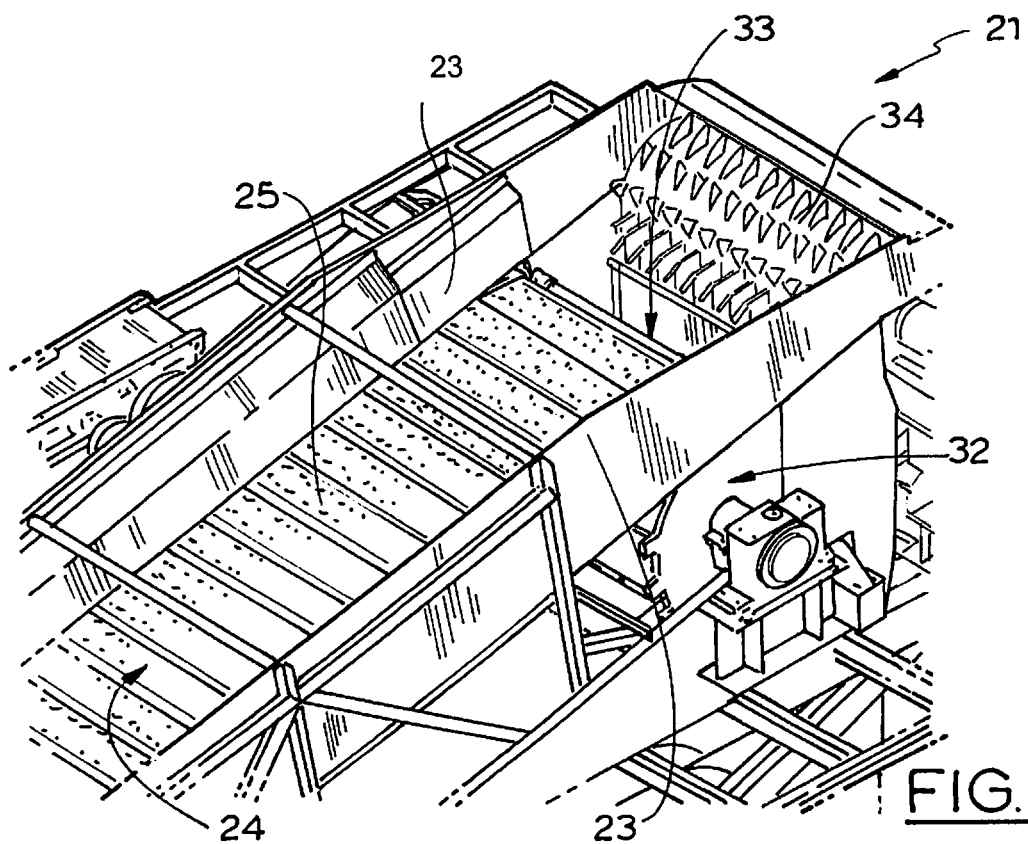
FIG. 3 is a view from above of an outlet end.

Referring now to FIGS. 1, 2 and 3, FIG. 2 illustrates the inlet end 20 and FIG. 3 illustrates the outlet end 21. As can be seen the frame supports respective sidewalls 23 of a conveyor trough 24 between which travels an endless plate conveyor 25.

The endless plate conveyor 25 comprises interconnected perforated plates 26 adapted to pivot relative to each other in chain like fashion so that the endless plate conveyor 25 effectively functions as a belt conveyor having rigid plates interconnected in pivotal fashion. In order to drive the endless plate conveyor 25 the plates 26 are carried by respective chains 27 and 28 forming a chain link arrangement connected at opposite ends 29 and 30 of the individual plates 26. Pairs of chainwheels 31 and 32 drive the conveyor with chain wheelset 32 being the driven set and chainwheel 31 being the idler set. Crushed or chopped cane is carried along the conveyor 25 in the trough 24 until it reaches outlet 33 where it is discharged into the first mill 11 under the assistance of spiked wheel 34.

It will be appreciated from FIGS. 2 and 3 that the endless plate conveyor 25 appears substantially belt like having small spaced ribs arising from the overlapping of curved edges 45 and 46 (see FIG. 8) of plates 26 along its length formed at the junction 34 of the adjacent plates 36. It will also be appreciated that the surface of the endless plate conveyor appears perforated fairly uniformly over the entire surface of the conveyor. Further details of the conveyor will be described in relation to FIGS. 4 to 6.

Returning now to FIG. 1, the conveyor assembly 10 includes a collection trough 35 running the length of the conveyor to an outlet from the connections at 36 in order to wash down the inside of the collection trough 35 return liquid from mills further down in the tandem is applied to the collection trough at the other end thereof through pipework shown generally at 37 so that liquid from the downstream mills may be delivered to the trough in order to wash down the trough and thereby inhibit the prospect of any accumulation of fibre or blockages.

Figure 4:
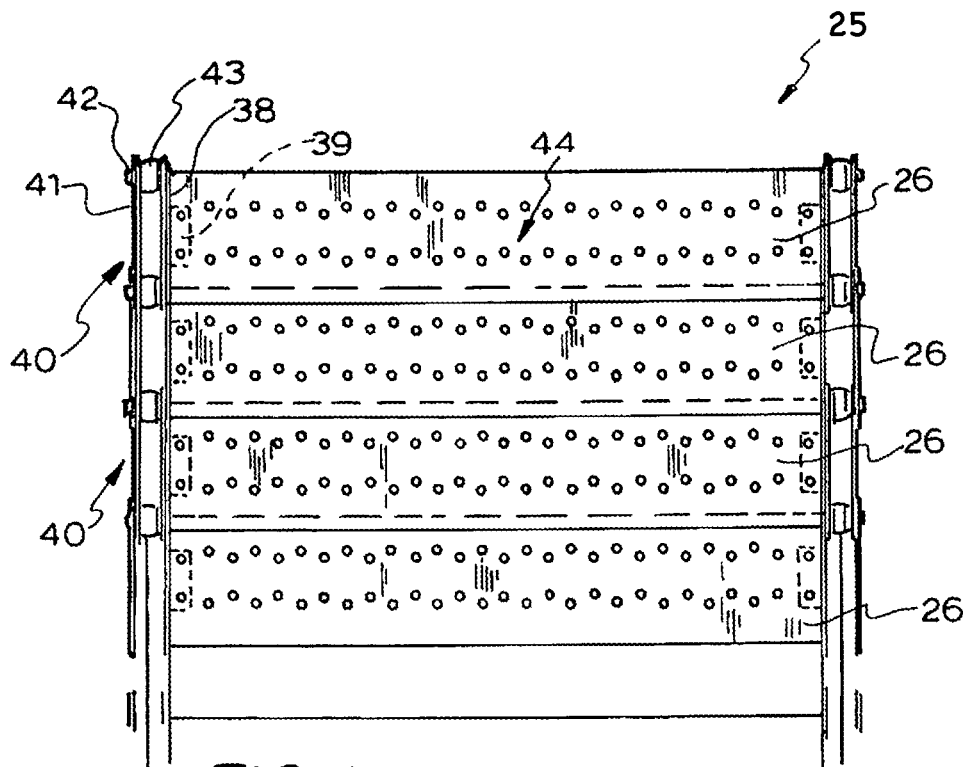
FIG. 4 is top view of part of an endless conveyor according to the invention.
Figure 5:
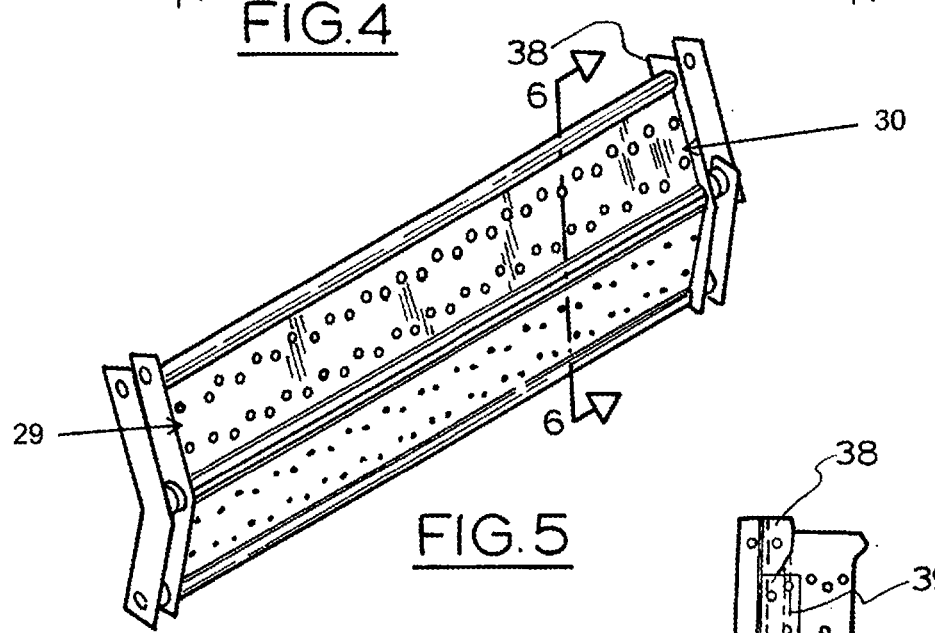
FIG. 5 is a drawing illustrating the pivotal connection of two adjacent plates in the conveyor.
Figure 6:
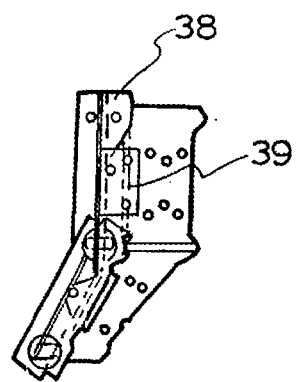
FIG. 6 is a section through A-A of FIG. 5.
Figure 7:
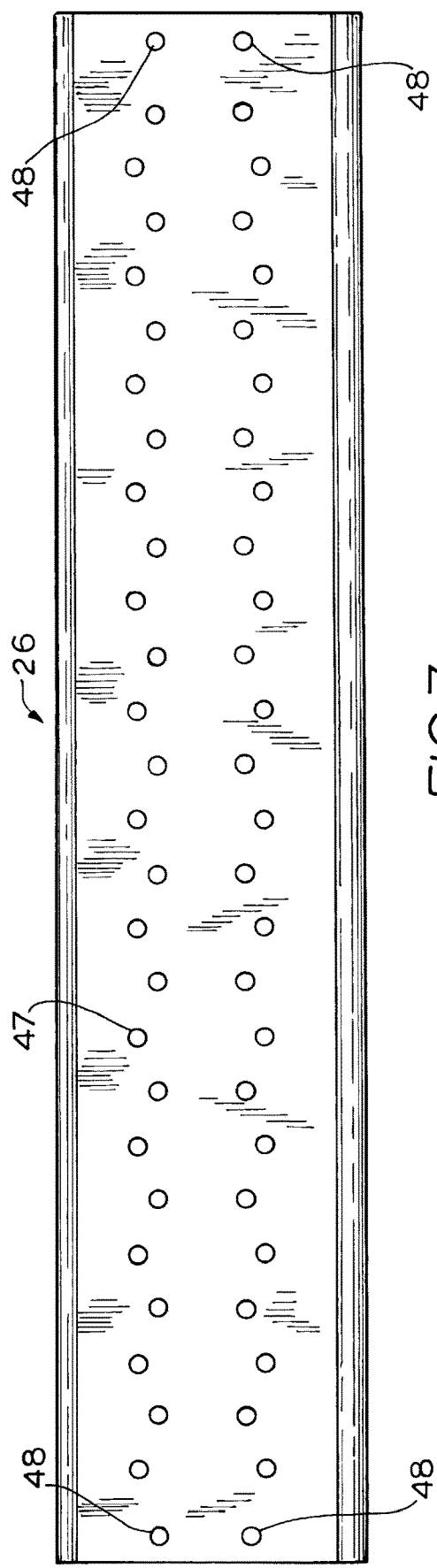
FIGS. 7 and 8 are respective plan and end views of a typical conveyor plate.

Referring now to FIGS. 4 to 6 there is illustrated an exemplary embodiment of an endless plate conveyor 25 of the general type illustrated in FIGS. 1 to 3 where four plates 26 are connected to chain link plates 38 via 90 degree angle connector flanges 39, it's chain link 40 is further comprised of an outer plate 41 and respective pivot pins 42 and roller spacers 43 which connect overlapping plates in each link which together from plates links 44.

As can be seen in FIGS. 4 to 6 the chains on each end of the plates form the primary motive mechanism for the conveyor and the plates 26 do not contribute in any way to the motive force but are simply to carry the chopped cane and provide a pattern of perforations shown at 44 for the purpose of drainage through the conveyor into the trough 35.

Figure 8:
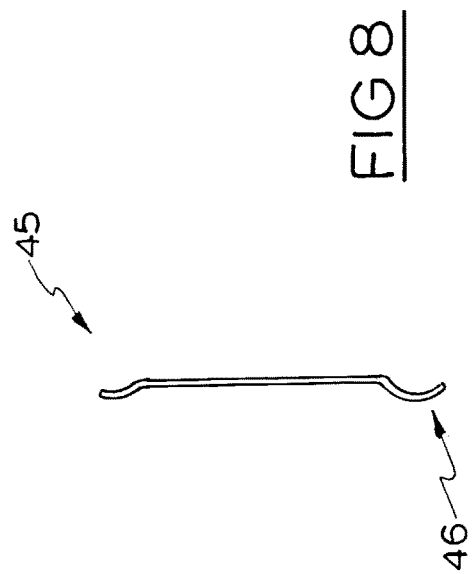

The plates 26 are identical and overlap along their edges 45 and 46 and these edges are pressed into a curved configuration as shown in FIG. 8 with a leading edge and a trailing edge with the edge 45 sitting inside the edge 46 being of slightly different diameter. The end result of this arrangement is that the trailing edge is the exposed edge at the surface of the conveyor and the edge 45 is concealed. The pressed edges 45 and 46 also serve to provide additional strength to the plates 26 forming ribs along its length.

In terms of size and dimensions the plate 26 in this embodiment is 1.7 m long with perforations being holes 47 of 20 mm diameter and at 60 mm centres along the length of the plate 26 and as can be seen in the illustrated embodiment the holes 47 are in two lines with alternate holes being offset as shown. Fixing holes 48 are provided at each end in order to secure the plate 26 to the chain link plate 38.

Figure 9:
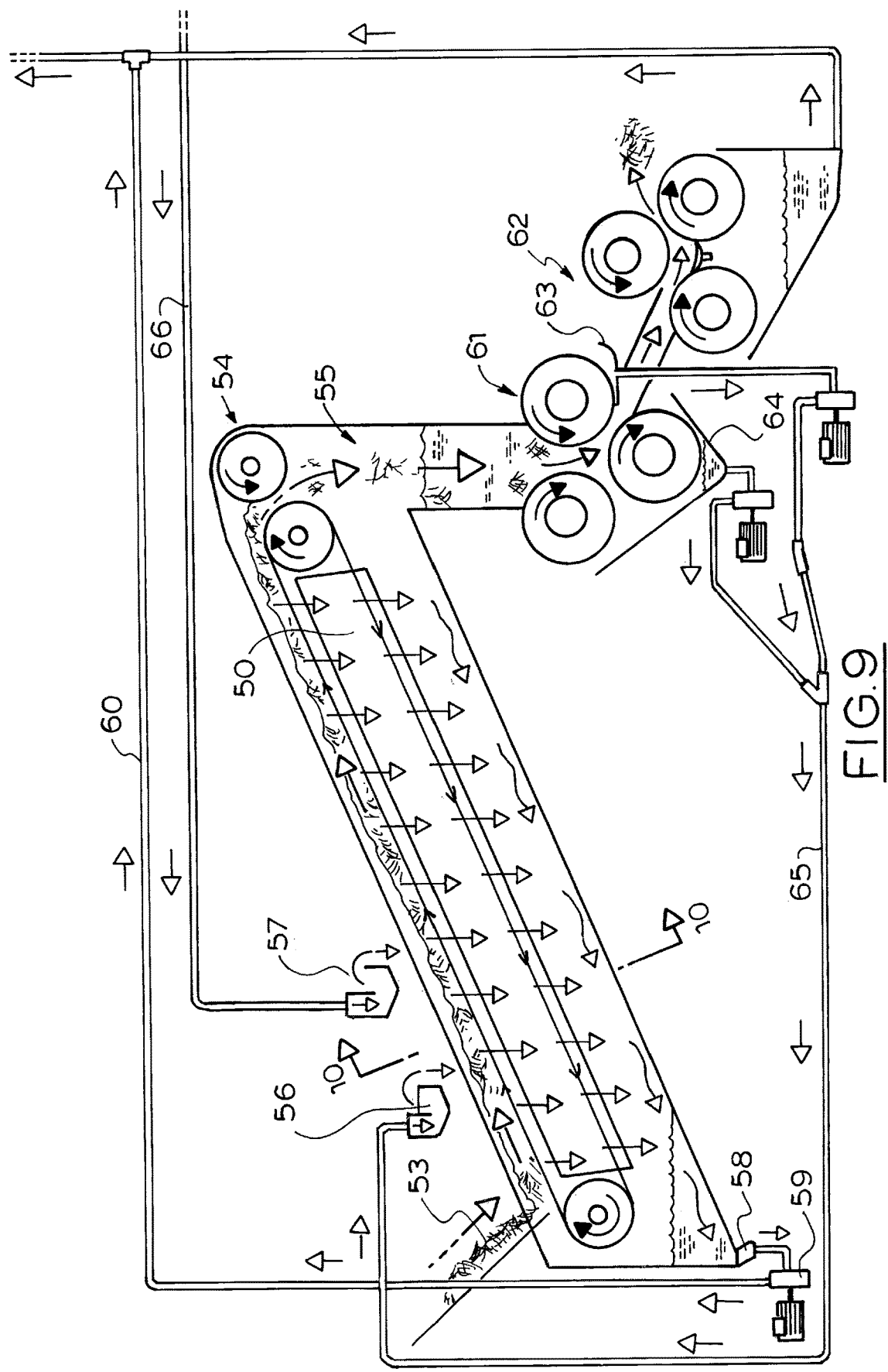
FIG. 9 is a drawing showing a further aspect of the invention.
Figure 10:
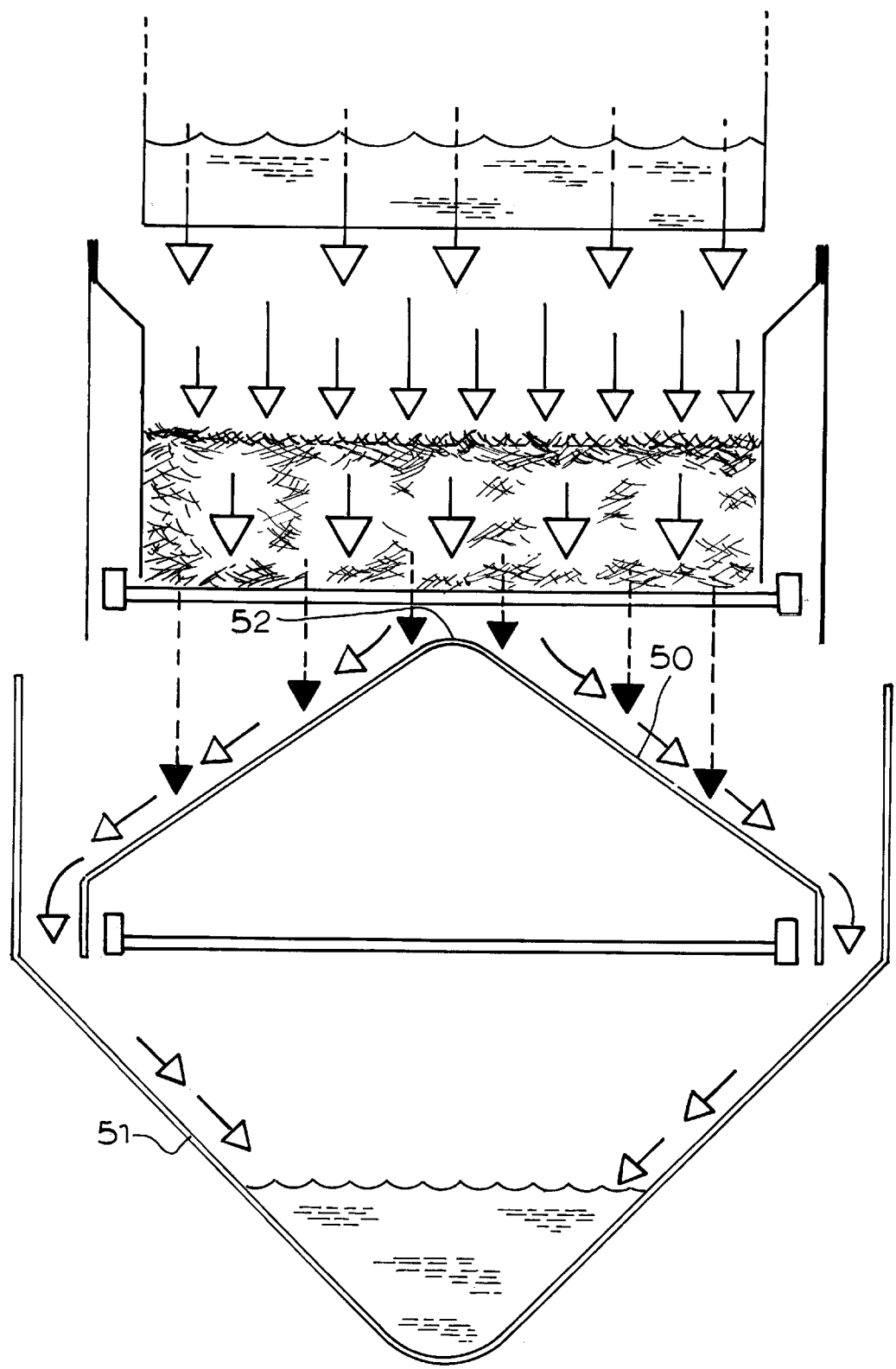
FIG. 10 is a section through 10-10 of FIG. 9.

Referring now to FIGS. 9 and 10 there is illustrated in FIG. 9 an overall schematic similar to the previous embodiments but showing the underside arrangement below the conveyor. In this case a juice deflector 50 and juice trough 51 are configured as axially extending and opposed V-shaped stainless steel plates with the deflector overlaying and deflecting juice around the return run of the conveyor. The deflector 50 has an apical region 52 which is rounded to inhibit fibre accumulation in this region.

The present invention takes high pol cane juice out of shredded cane, prior to the first mill in a milling tandem in a sugar factory. The result of doing this is that the total extraction of juice from sugar cane is increased for a given number of mills, or maintained with less mills in the tandem.

In the preferred process cane is shredded as finely as possible in a shredding device, for example, a cane shredder, after shredding, most of the juice that was in cane juice cells has been released and is now free to wash away from the cane fibres. Washing is done in a way that does not increase the thermal load on the factory. The conveyor is positioned between the cane shredder and the pressure feeder (or other feeder, or mill) usually at an inclination from under the shredder to above the pressure feeder.

Thus as is preferred the assembly, conveyor and process comprises the following.

A chain conveyor, two endless chains plus slats between the chains with drive sprockets at the delivery end, and return sprockets at the opposite end. The width of the chains and slats is normally about equal to the width of the first mill in the milling tandem.

Shredded cane sits on the top of the slats between the two chains. There are vertical sides to locate the shredded cane above the slats. There is a hopper or sloping delivery chute to feed shredded cane onto the slats on the feed-in end of the conveyor at 53, from the shredder. There can be a spinning kicker at the feed-out end at 54 to prevent any choking at the top of a narrow vertical hopper 55. The spinning kicker may not be required for wide open vertical hoppers.

Two overflow weirs 56 and 57 are located above the conveyor adjacent to and just downstream of the feed-in end. One for giving full width coverage over the shredded cane, for pressure feeder (or other feeder, or mill) juice. Preferably, pressure feeder juice. The second weir is for No. 2 mill juice.

The slats have lots of holes to allow juice to pass through, but prevent cane fibre from also passing through with the juice. 20 mm diameter holes work very well without blockages or allowing fibre to pass through. Underneath the top slats, there is an inverted V-shaped deflector 50 with the top curved at 52 to prevent fibre from sitting on the curved surface, as it would on a sharp shaped top. This sloping structure catches all of the juice flooding out from the top slats and directs it down both slopes over the lower chains and slats, but not allowing contact with the lower chains and slats. The juice is directed to the lower juice trough 51 where it flows down the sloping trough to an outlet 58 at the lower end of the trough. A high capacity pump 59 is connected to this outlet. The pump delivers juice from the maceration conveyor to a rotary juice screen (not shown) where any fibre is separated from the juice. No. 1 mill juice is also delivered to this rotary juice screen for the same reason. The strained juice from the maceration conveyor and No. 1 mill is then pumped away to process along line 60.

The shredded cane passes down through the vertical hopper 55 to the No. 1 mill pressure feeder at 61 and then into the No. 1 mill at 62. Juice squeezed out by the pressure feeder flows out onto a trough 63 behind the top pressure feeder roller, and out from the bottom pressure feeder roller into a trough 64 under the pressure feeder rollers, having the two flows separated allows either flow or both flows to be pumped to the first weir 56 above the maceration conveyor along line 65. Because the juice in the upper part of the shredded cane in the maceration conveyor will have more of the low brix juice than the lower part of the shredded cane, it would be the preferred juice flow to be pumped to the first weir. This juice flows out from the top pressure feeder roller. However, a much larger flow of combined juice from both pressure feeder rollers will probably have a greater effect of washing the cane juice through the top slats. In any case it would be desirable to have two pumps in case a single flow was preferred, or both flows were preferred. Because much of the cane juice is washed out from the shredded cane the brix of juice from the No. 2 mill (the next mill in the tandem which is not shown) is now much lower. And this juice is squeezed out by the pre mill pressure feeder then pumped to the second weir as low brix juice along line 66. The better the washing effect of the conveyor, the lower the brix of this juice, and the higher the pol extraction of this maceration conveyor.

Because of the much-reduced brix of cane entering the first mill, it will be possible to reduce the number of (costly to maintain and operate) mills in the tandem.

The speed of the maceration conveyor can be varied to alter the height of shredded cane above the slats. Usually in a range of from 200 mm high to 500 mm high. The higher depth of shredded cane increases the drainage time for juice passing through the fibre mat. However, this flow rate is quite rapid.

The maceration conveyor does not affect the moisture of bagasse leaving the milling tandem and therefore does not affect the operation of the boiler/s burning cane fibre for all the energy required for operating the factory.

Juice flows can vary from about 100% on fibre weight to above 400% on fibre weight. So the pumping capacity of the recirculating pumps pumping juice from the pressure feeder have to match this flow rate.

Whilst the above has been given by way of illustrative example many variations and modifications will be apparent to those skilled in the art without departing from the broad ambit and scope of the invention as set out in the appended claims.

The invention claimed is:

1. In an endless maceration conveyor in a sugar cane factory, the conveyor having a forward run and a return run and there being an underside arrangement extending along and below the forward run of the conveyor, the conveyor having marginal edges and the underside arrangement employing a juice deflector to deflect juice about the return run of the conveyor and there being a juice trough having respective opposed side walls, the side walls overlapping the marginal edges of the conveyor along and below the return run, so that the deflector deflects juice into the trough.

2. An endless maceration conveyor according to claim 1 wherein deflector and trough are configured as axially extending and opposed V-shaped stainless steel plates with the deflector overlaying and deflecting juice around the return run of the conveyor into the trough.

3. An endless maceration conveyor according to claim 2 wherein opposite ends of the trough comprise a trough inlet at one end and a trough outlet at the other end, the conveyor having a conveyor inlet end adjacent the trough inlet end and an outlet adjacent the trough outlet, respective chainwheel pairs at the opposite ends of the conveyor being adapted to engage chain links, one chainwheel pair comprising a drive set and the other chainwheel pair comprising an idler set, a drive connected to the drive set, the inlet to the conveyor and the inlet to the trough being located below the outlet so that the conveyor and trough are inclined, the drive being located adjacent the outlet.

4. An endless maceration conveyor according to claim 2 wherein the deflector has an axially extending apical region which is rounded to inhibit fibre accumulation in this region.

5. An endless maceration conveyor according to claim 2 wherein the conveyor comprises a chain like arrangement of pivotally connected flow through plates arranged to form a substantially contiguous surface across adjacent plates along an upper contact surface of the conveyor in order to inhibit clogging of the conveyor.

6. An endless maceration conveyor according to claim 2 wherein the conveyor has flow through plates having holes distributed through a central region of the plate with marginal edge regions being absent holes.

7. An endless maceration conveyor according to claim 1 wherein the deflector has an axially extending apical region which is rounded to inhibit fibre accumulation in this region.

8. An endless maceration conveyor according to claim 1 wherein the conveyor comprises a chain like arrangement of pivotally connected flow through plates arranged to form a substantially contiguous surface across adjacent plates along an upper contact surface of the conveyor in order to inhibit clogging of the conveyor.

9. An endless maceration conveyor according claim 8 wherein the plates bridge between respective drive chains having chain links, each chain link having a plate attachment and each plate having a corresponding chain link attachment at each end, adjacent plates share pivotal sliding surfaces extending between opposed chain links, each plate having edges formed to accommodate mutual sliding on an underside of the plates, each plate having a leading edge and a trailing edge, the leading edge of each plate being concealed under the trailing edge of the adjacent plate.

10. An endless maceration conveyor according to claim 8 wherein the plates bridge between respective drive chains having chain links, each chain link having a plate attachment and each plate having a corresponding chain link attachment at each end, adjacent plates share pivotal sliding surfaces extending between opposed chain links, each plate having edges formed to accommodate mutual sliding on an underside of the plates, each plate having a leading edge and a trailing edge, the leading edge of each plate being concealed under the trailing edge of the adjacent plate, each edge being part of a curve, the respective curves on each plate being of slightly different diameter to each other.

11. An endless maceration conveyor according to claim 1 wherein the conveyor has flow through plates having holes distributed through a central region of the plate with marginal edge regions being absent holes.

12. An endless maceration conveyor according to claim 1 wherein a collection trough is located below the conveyor, a collection trough washdown facility adapted to supply wash down liquid to the collection trough in order to wash down any fibrous material accumulating in the trough.

13. An endless maceration conveyor according to claim 1, the forward run having an outer conveying surface, the outer conveying surface being substantially planar along the conveyor and comprising relatively narrow overlapping plates, the conveyor being divided along its length by the plates overlapping at their junctures, where along the forward run the junctures present downwardly curving overlapping edges of adjacent plates, respective chains attached to opposite ends of the plates, each plate having a corresponding chain link, a chain drive at the end of the forward run and an idler at the end of the return run, driving the chains in concert to thereby drive the conveyor, each plate having a leading edge and a trailing edge such that in the forward run, the leading edge is located under the trailing edge of an adjacent plate, the juncture of adjacent plates provides a small raised section complementing the downwardly curved overlapping leading and trailing edges.

14. An endless maceration conveyor according to claim 1 being inclined to the horizontal and having axially spaced return weirs returning maceration liquid to a lower end of the conveyor wherein a collection trough is located below the conveyor, an underside arrangement below the conveyor includes the juice deflector between the conveyor and the trough, the deflector being arranged to deflect juice around the return run of the conveyor above the trough.

15. An endless maceration conveyor according to claim 1 being inclined to the horizontal and having axially spaced return weirs returning maceration liquid to a lower end of the conveyor wherein a collection trough is located below the conveyor, the deflector having sides and an apical region which is rounded to inhibit fibre accumulation in this region of the deflector.

16. An endless maceration conveyor according to claim 1 being inclined to the horizontal and having axially spaced return weirs returning maceration liquid to a lower end of the conveyor, there being a juice trough below the deflector which deflector and trough are configured as axially extending and opposed V-shaped stainless steel plates with the deflector overlaying and deflecting juice around the return run of the conveyor, the conveyor comprises a chain like arrangement of pivotally connected flow through plates arranged to form a substantially contiguous surface across adjacent plates along an upper contact surface of the conveyor in order to inhibit clogging of the conveyor.

17. An endless maceration conveyor according to claim 1, wherein opposite ends of the trough comprise a trough inlet at one end and a trough outlet at the other end, the conveyor having a conveyor inlet end adjacent the trough inlet end and an outlet adjacent the trough outlet, respective chainwheel pairs at the opposite ends of the conveyor being adapted to engage chain links, one chainwheel pair comprising a drive set and the other chainwheel pair comprising an idler set, a drive connected to the drive set, the inlet to the conveyor and the inlet to the trough being located below the outlet so that the conveyor and trough are inclined, the drive being located adjacent the outlet.

* * * * *